Figure 1:
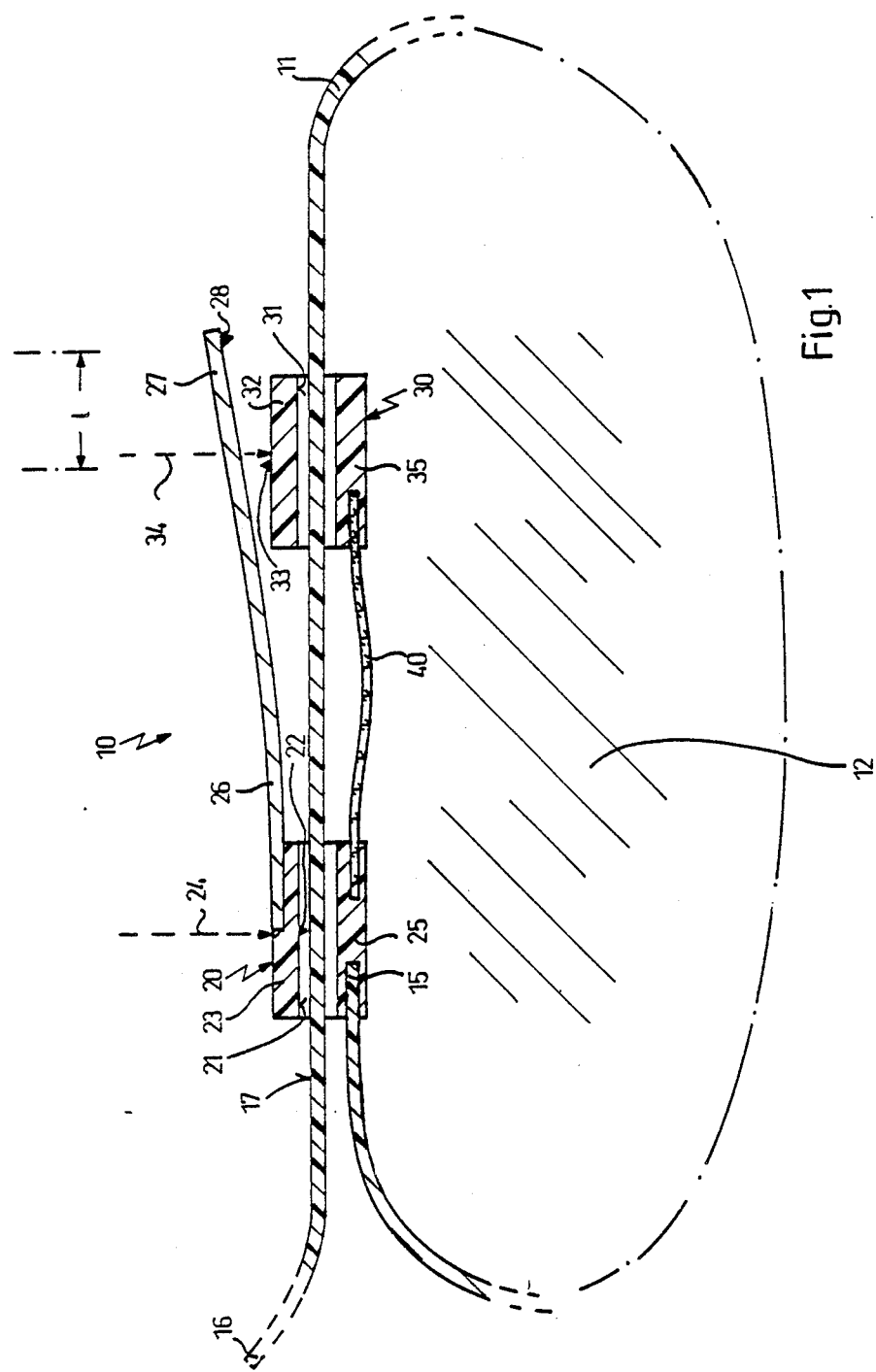
Figure 2:
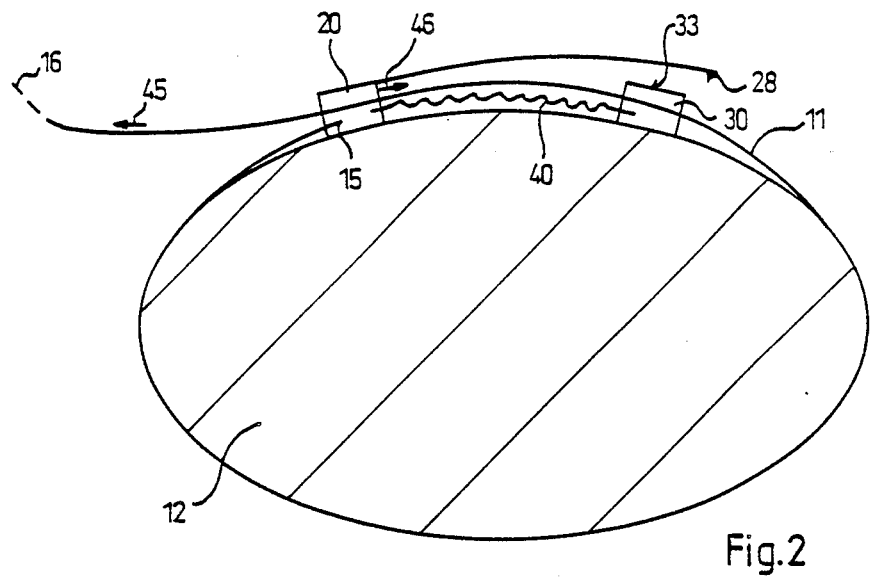

United States Patent [19]

Becher

[11] Patent Number: 4,920,659

[45] Date of Patent: May 1, 1990

[54] MEASURING APPARATUS FOR DETERMINING A CIRCUMFERENTIAL LENGTH OF A BODY

[76] Inventor: Reinhard Becher, Engelbergstrasse 42, D-7000 Stuttgart 31, Fed. Rep. of Germany

[21] Appl. No.: 253,968

[22] Filed: Oct. 5, 1988

[51] Int. Cl.⁵ .............................................. G01B 3/10
[52] U.S. Cl. .................................. 33/555.4; 33/555.1; 33/561.2
[58] Field of Search ................. 33/175, 176, 179, 759, 33/755, 14, 15, 555.1, 555.4, 561.2

[56] References Cited

U.S. PATENT DOCUMENTS

| | | | |
|---|---|---|---|
| 1,857,523 | 5/1932 | Wittel | 33/179 |
| 2,428,980 | 10/1947 | McCann | 33/179 |
| 4,433,486 | 2/1984 | Muehlenbein | 33/179 |
| 4,441,258 | 4/1984 | McDaniel et al. | 33/179 |
| 4,459,754 | 7/1984 | Yasuda et al. | 33/179 |
| 4,473,949 | 10/1984 | Schechtman | 33/179 |

FOREIGN PATENT DOCUMENTS

| | | | |
|---|---|---|---|
| 917272 | 7/1954 | Fed. Rep. of Germany | 33/179 |
| 1052696 | 5/1958 | Fed. Rep. of Germany | |
| 224917 | 7/1985 | Fed. Rep. of Germany | 33/755 |
| 2303266 | 10/1976 | France | 33/179 |
| 285224 | 5/1931 | Italy | 33/179 |
| 2743 | of 1914 | United Kingdom | 33/179 |
| 232703 | 4/1925 | United Kingdom | 33/179 |

Primary Examiner—Allan N. Shoap
Assistant Examiner—Diego F. F. Gutierrez
Attorney, Agent, or Firm—Harness, Dickey & Pierce

[57] ABSTRACT

A measuring apparatus for determining a circumferential length of a body comprises an elongate, non-extensible tape measure having a first and a second terminal. A measuring scale is applied to the tape measure. A first and a second sliding part are provided for axially guiding the tape measure. Both sliding parts are provided with an actuating unit allowing to either axially lock the tape measure or to make it axially displaceable in the sliding part. Further, both sliding parts are provided with index marks to allow reading a measuring value with respect to the measuring scale. An elastic band is arranged between the two sliding parts. The tape measure is fixedly attached with one of its terminals to one of the sliding parts. The tape measure then extends around the circumference of a body to be measured, then through the other sliding part and, then, again through the first sliding part. The loop thus formed may be extended by stretching the elastic band. By consecutively locking and unlocking the tape in stretched and non-stretched conditions of the elastic band, a measurement of the circumferential length may be made with a predetermined axial tension in the tape measure to avoid reading errors generated by varying tape tension when measurements are made on elastic bodies.

4 Claims, 4 Drawing Sheets

MEASURING APPARATUS FOR DETERMINING A CIRCUMFERENTIAL LENGTH OF A BODY

The present invention relates to a measuring apparatus for determining a circumferential length of a body. Such measuring apparatuses are used for determining e.g. the girth of a human body, for example the girth of the waist or of the biceps, or the like. Particularly, the measuring apparatus may be used in the dressmaking business or by private individuals to determine and control their measures, e.g. during long-term body-building.

One of the problems coming up in conjunction with this measuring object is that the human body, the girth of which shall be determined, is elastic so that the measuring result is, among others, dependent on the particular tension exerted on the non-extensible tape measure.

A prior art measuring apparatus as described in West German published application No. 10 52 696 is provided with an elastic band, attached with its one terminal to the tape measure at an axial position offset from one terminal of the tape measure. The other terminal of the elastic band is attached to a non-elastic plate which, in turn, is provided with a slot. The second terminal of the tape measure is guided through this slot. The length of the elastic band and the axial offset of the position where the elastic band is attached to the tape measure, are dimensioned such that the first terminal of the tape measure ends in an axial position above the non-elastic plate and cooperates with an index mark that is applied to the surface of the plate.

When using this prior art measuring apparatus, the tape measure is wound around the body to be measured, and the second free terminal is guided through the slot in the plate. Now, the user will pull the second free end until the elastic band is stretched so far that the first terminal of the tape measure axially coincides with the index mark on the plate.

In such a way, the prior art measuring apparatus shall ensure that a predetermined axial tension is established in the tape measure so that measuring errors are avoided which could occur if due to varying axial tension in the tape measure and, hence, varying compression of the elastic body to be measured, variations of the reading are generated.

However, it is a drawback of this prior art measuring apparatus that even if the elastic band is subjected to a predetermined axial tension, it may not be guaranteed that this predetermined tension is acting on the entire tape measure. As mentioned before, the second free terminal of the tape measure is guided through a slot in the plate where it is deflected by about 180 degrees. Therefore, the tape measure is subjected to substantial friction when guided through the slot of the plate so that it cannot be assured that the pull, manually exerted on the second free terminal of the tape measure, will fully be transmitted to the remainder of the tape measure through the slot guide. In contrast, one has to envisage that in view of the substantial friction in the slot, the axial pulling force will be directly transmitted to the plate so that only the elastic band will be stretched without exerting an axial pull on the tape measure at all. Even if the user of the known measuring apparatus would grasp the plate with one hand and grasp the second free terminal of the tape measure with his other hand to pull thereon, it is not guaranteed that the exerted pulling force is actually transmitted on the elastic band. In order to do so, it would, namely, be necessary that the tape measure be applied to the body circumference without any friction, because only then the axial pull exerted on one terminal of the tape measure would be transmitted to the opposite terminal. However, in practice, the tape measure is applied to the body with substantial friction, particularly, if the tape measure is directly applied on the naked dry skin. Then, the axial pull exerted on the second free terminal of the tape measure is essentially higher than the pull transmitted on the elastic band or, in other words, the axial pull will continuously decrease from the plate slot to the elastic band.

It is apparent that in this way substantial errors in determining the circumferential length may occur.

It is, therefore, an object of the present invention to provide for a measuring apparatus in which the axial pulling force of the tape measure remains constant over the circumference of the tape measure such that body circumference or girth may be measured with constant tension of the tape measure and, thus, reproducibly.

According to the invention, this object is achieved by a measuring apparatus for determining a circumferential length of a body, comprising an elongate, non-extensible tape measure having a first and a second terminal; a measuring scale applied to said tape measure; a first guide means for guiding said tape measure, and having a first actuating unit for either axially locking or allowing axial displacement of said tape measure relative to said first guide means, and, further, having a first index mark adjacent said tape measure; a second guide means for guiding said tape measure, and having a second actuating unit for either axially locking or allowing axial displacement of said tape measure relative to said second guide means, and, further, having a second index mark adjacent said tape measure; an elastic element having a first terminal fixedly attached to said first guide means and having a second terminal fixedly attached to said second guide means; said first terminal of said tape measure being fixedly attached to said first guide means in a direction opposite said elastic element, said tape measure extending from said first guide means through said second guide means for being guided therein adjacent said second index mark and, then, extending further through said first guide means for being guided therein adjacent said first index mark.

The object of the present invention is, thus, entirely achieved, because the guide means and the locking of the tape measure to the guide means allow a measuring apparatus with which a section of the tape measure is arranged in series with the elastic element as a closed loop around the circumference of the body, whereas the free measuring terminal of the tape measure is free of axial pulling force. Therefore, the user of the measuring apparatus has the possibility, e.g., to insert a finger between the tape measure and the body and to move his finger around the circumference of the body in order to release friction between the tape measure and the body and, hence, to cause the tape measure to be applied uniformly and free of friction around the circumference of the body.

The measuring readings, made with the measuring apparatus according to the invention, are, therefore, strictly reproducibly, because the measuring apparatus always measures with the same axial pulling force bias which corresponds to the extension of the elastic element when the guide elements are in their extended axial position with respect to each other. The pulling force over the entire length of the tape measure between the guide means is constant.

According to a preferred embodiment of the invention, the elastic element is made as an elastic band.

This has the particular advantage that the elastic element may be arranged as a flat small element below the tape measure so that no bulky elements have to be used. Further, standard elastic bands or rubber bands maintain their elasticity even in long-term use.

In a further preferred embodiment of the invention, a cantilevered non-extensible strip is attached to one of the guide means and has a third index mark on its other free end, cooperating with the second index mark.

These measures have the advantage that the user of the measuring apparatus may easily stretch the elastic element by a predetermined length without the necessity of making calculations, because it is sufficient to just bring the second and the third index marks into the same axial position.

According to still another embodiment of the invention, the guide means are made as sliding parts with through-slots through which the tape measure is guided.

These measures have the advantage that the guide means are permanently applied on the tape measure and cannot be lost.

Further advantages of the invention will become apparent from the description of a preferred embodiment in connection with the accompanying drawings.

However, it goes without saying that all of the features of the invention, described hereinbefore or hereafter, may not only be used in the particular combination as explicitly mentioned, but, further, also in other combinations or alone without leaving the scope of the present invention.

A preferred embodiment of the invention is shown in the accompanying drawing and will be described hereinafter. In the drawing:

FIG. 1 a schematic cross-sectional view of an embodiment of a measuring apparatus according to the invention;

FIGS. 2 through 7 the measuring apparatus of FIG. 1, in compressed scale, for various operational positions during the measurement of circumferential length of a body.

In FIG. 1, reference numeral 10 as a whole indicates an embodiment of a measuring apparatus according to the invention. The apparatus 10 comprises a tape measure 11 being wound around a body 12. The tape measure 11 is made of non-extensible material, whereas body 12 consists of an elastic material.

Tape measure 11 has a first terminal 15 and a second, free terminal 16. Between terminals 15 and 16, tape measure 11 is provided with a measuring scale, indicated at 17. Tape measure 11 may, therefore, be an ordinary plastic material tape measure as used, e.g., in the dressmaking business or by private persons to measure and control the girth of their waist, their biceps, or the like.

A first sliding part 20 is provided with a through-slot 21 through which the free second terminal 16 of tape measure 11 is guided. In the position depicted in FIG. 1, second terminal 16 is guided such that it may be displaced longitudinally in through-slot 21.

A first index mark 22 is arranged on an upper portion 23 of first sliding part 20 such that a user of the measuring apparatus 10 may make a reading from above first sliding part 20 with respect to the relative position of first index mark 22 relative to measuring scale 17. For this purpose, upper portion 23 may, e.g., be made of a translucent plastic material, and first index mark 22 may be made as a line on upper portion 23 in a direction perpendicular to the plane of FIG. 1.

Reference numeral 24 indicates a first actuating unit with which tape measure 11 may be locked axially in first sliding part 20. First actuating unit 24 may be actuated freely such that tape measure 11 may either be arranged freely axially displaceable or locked in first sliding part 20, as maybe the will of the user.

In that actuating unit 24, by either axially locking or allowing axial displacement of the tape measure 11, functions in the same manner as an infinitely adjustable belt buckle, any conventional means for accomplishing this technical purpose may be employed. For example, suitable actuating units are illustrated and described in U.S. Patent to McDaniel et al., U.S. Pat. No. 4,441,258, and German Patentschrift to Zangl, Pat. No. 917,272."

First sliding part 20, further, is provided with a lower portion 25 to which first terminal 15 of tape measure 11 is fixedly attached. Tape measure 11 extends from first terminal 15 in a direction, corresponding to the direction of second terminal 16 from first sliding part 20.

On its further length, tape measure 11, from first terminal 15 on, after being wound around the longest portion of body 12 circumference, is guided at a second sliding part 30, being made similar to first sliding part 20. Second sliding part 30 is, also, provided with a through-slot 31 through which tape measure 11 is guided.

A third index mark 33 is arranged on an upper portion 32 of second sliding part 30, as indicated from above in the representation of FIG. 1.

Second sliding part 30 is provided with a second actuating unit 34, being made similar to first actuating unit 25 of first sliding part 20. Thus, it is possible to either make tape measure 11 be freely axially displaceable or locked in second sliding part 30, as may be the will of the user.

Second sliding part 30, further, is provided with a lower portion 35. An elastic band 40 with its two terminals is fixedly attached to lower portions 25 and 35 of sliding parts 20 and 30, respectively. A non-extensible cantilevered strip 26 with one of its ends is attached to upper portion 23 of first sliding part 20. Strip 26 extends essentially parallel to tape measure 11 and to elastic band 40 and extends into the vicinity of second sliding part 30. A free end 27 of strip 26 is provided with a second index mark 28, being made to cooperate with third index mark 33 on upper portion 32 of second sliding part 30.

FIG. 1 shows sliding parts 20 and 30 in an axial position in which elastic band 40 is just in the transitional state between a stretched and an unstretched state. As can clearly be seen, in this position, second index mark 28 is axially offset by a length l relative to third index mark 33. If, therefore, sliding parts 20 and 30 are axially displaced away from each other from the position of FIG. 1 until index marks 28 and 33 are at the same axial position, axial band 40 will be stretched by a predetermined amount, namely by length l.

In a preferred embodiment of the measuring apparatus according to the invention, tape measure 11 is an ordinary tailor tape measure, and elastic band 40 is an ordinary elastic rubber band having, in its unstretched state, a length of approximately two inches, and exerting an elastic pull of about 0.5 N when stretched elastically by about one inch.

The operation of measuring apparatus 10 as shown in FIG. 1 shall now be described with reference to the representations of FIGS. 2 through 7.

Measuring apparatus 10 is first spirally wound around a body 12 without any deflections such that actuating units 24 and 34 allow free axial movement of tape measure 11 in sliding parts 20 and 30, respectively. As indicated by arrows 45 and 46, the user may now pull on terminals 15 and 16 of tape measure 11 until tape measure 11 is tightly wound around body 12 without, however, exerting axial tension thereon. In this position, index marks 28 and 33 are axially offset from each other, because elastic band 40 is not subjected to pull, because second sliding part 30 freely runs on tape measure 11.

Figure 3:
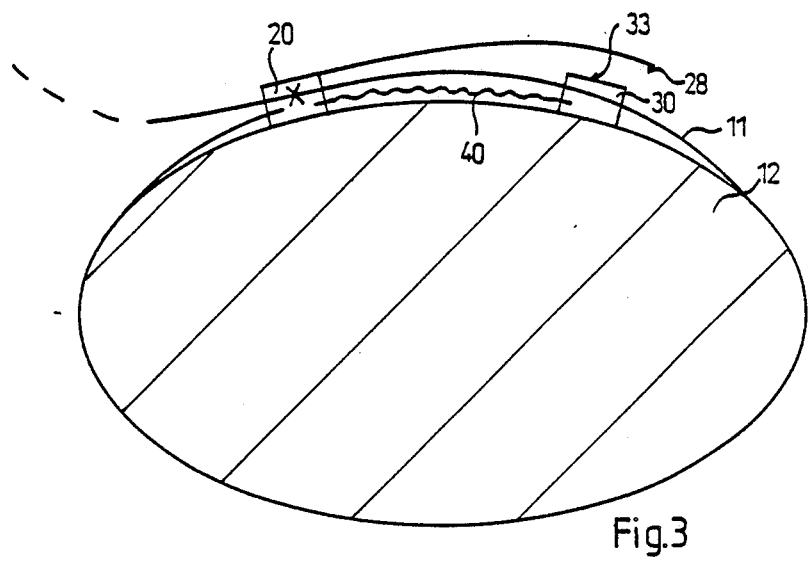

Next, first actuating unit 24 is actuated according to FIG. 3 and, therefore, tape measure 11 will be axially locked in first sliding part 20, as indicated by an X in FIG. 3. The relative position of index marks 28, 33 is not influenced by this step. There is very little, if any, axial tension on tape measure 11 at this moment.

After having actuated first actuating unit 24, entire measuring apparatus 50 may now be taken off from body 12 or may rest thereon, as may be the will of the user.

Figure 4:
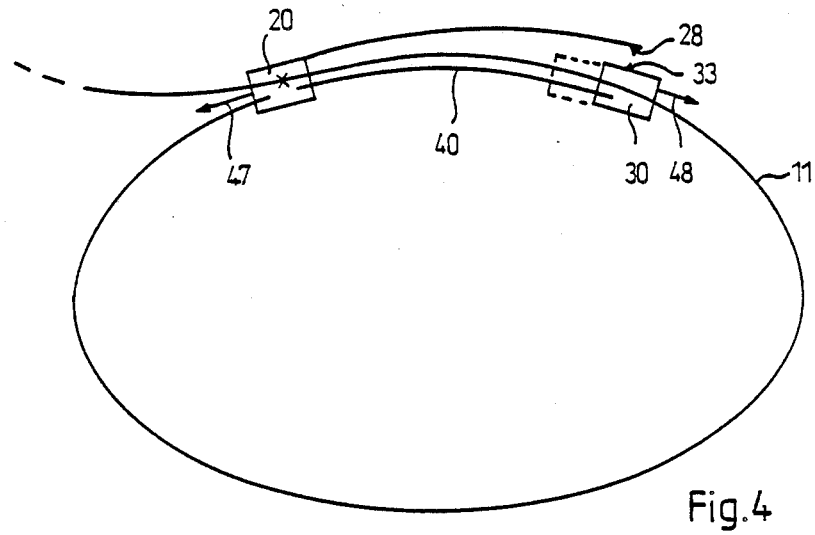

In a next step, as shown in FIG. 4, elastic band 40 will now be stretched, as indicated by arrows 47 and 48, such that index marks 28 and 33 do axially coincide.

It goes without saying that the arrangement of cantilevered strip 26 and its second index mark 28 is just an example for one embodiment of the invention. The predetermined tension in elastic band 40 may be generated according to FIG. 4 also by first reading the relative position of third index mark 33 relative to measuring scale 17 in the unstretched state of elastic band 40 (FIG. 3) and, then, mentally subtracting a length l from the read measuring value such that the predetermined axial tension is established in elastic band 40. However, this requires a mental calculating step made by the user, whereas the arrangement of cantilevered strip 26 with its second index mark 28 does not require any calculation.

Figure 5:
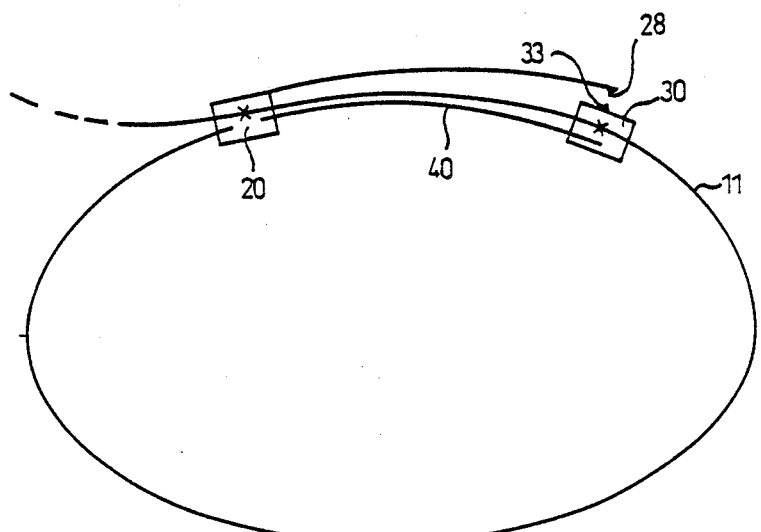

After having stretched elastic band 40 (FIG. 4) by length l, second actuating unit 34 is actuated and, hence, second sliding part 30 is locked to tape measure 11, as indicated by an X in FIG. 5.

Figure 6:
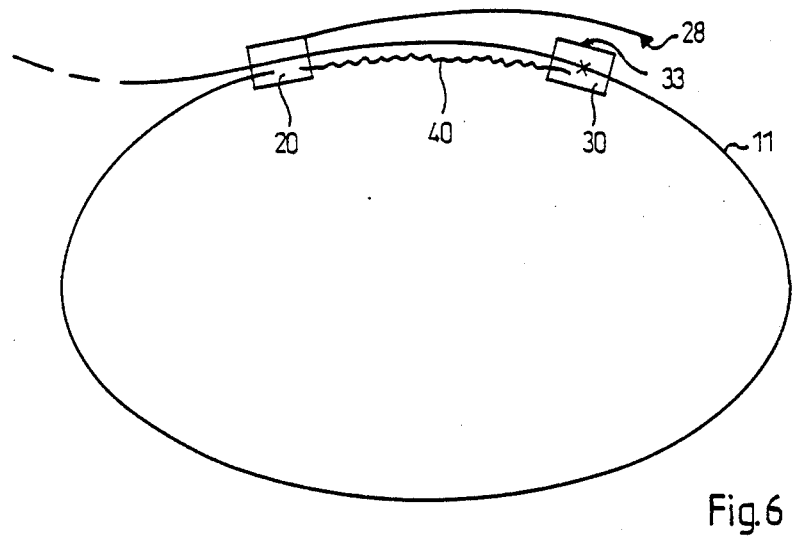

As a next step, as shown in FIG. 6, first actuating unit 24 is again released such that tape measure 11 may now again freely run through first sliding part 20. If this is done when measuring apparatus 10 is taken from body 12, as shown in FIG. 6, elastic band 40 will assume its unstretched state again. In this condition, measuring apparatus 10 may again be applied to body 12, in case it has been taken therefrom before.

Figure 7:
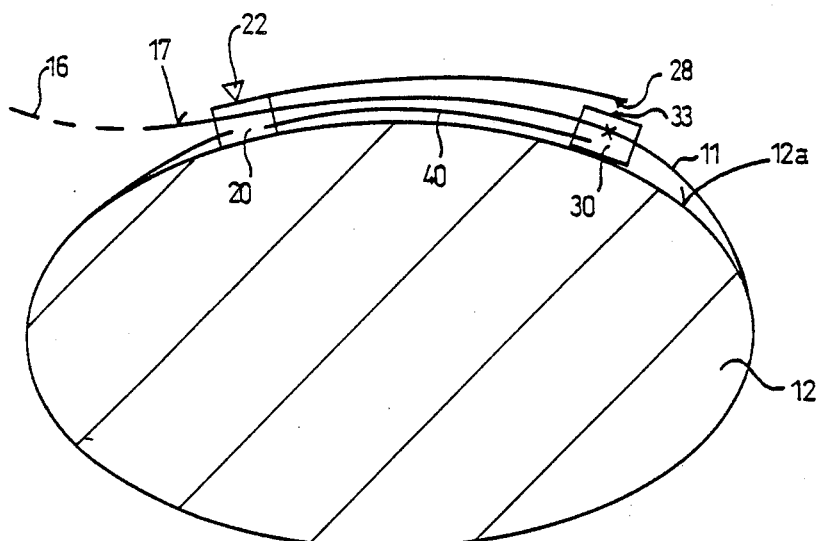

In both cases, a condition is thus reached as is shown in FIG. 7. Index marks 28 and 23 do now again axially coincide if measuring apparatus 10 is again applied to body 12 such that tape measure 11 is now subjected to a uniform tension throughout the circumference of body 12. This may still be enhanced in that the user of the measuring apparatus 10 inserts his finger between tape measure 11 and body 12 and slightly lifts off tape measure 11 over the entire circumference of body 12 by moving his finger around body 12 such that tape measure 11 is now applied to body 12 with an exactly uniform tension throughout its length. This is possible with the measuring apparatus 10 of the present invention, because it establishes a closed measuring arrangement around body 12 consisting, by a larger section of body 12 circumference, from tape measure 11 which, in the circumferential direction is fixedly stretched between sliding parts 20 and 30, respectively, and, further, consisting, by a smaller section of body 12 circumference, from elastic band 40 which is subjected to the predetermined tension.

Free measuring terminal 16 of tape measure 11, in contrast, may be freely axially displaced in first sliding part 20 such that the user of measuring apparatus 10 has both hands free.

The measuring value can, then, be read from first index mark 22 relative to measuring scale 17.

If the measuring apparatus 10 according to this invention is used for controlling the girth of a human body in predetermined time intervals, the user may leave second actuating unit 34 actuated thus leaving tape measure 11 locked to second sliding part 30. As long as after applying measuring apparatus 10 to body 12 again, index marks 28 and 33 do axially coincide or remain coinciding within a certain axial tolerance band, as may be established by making third index mark 33 an axial wide bar, the girth to be measured has not changed. However, as soon as index marks 28 and 33 do no more axially coincide or are outside the aforementioned tolerance band, a fresh measurement is necessary to determine the new girth value. One can, then, proceed as described hereinbefore with respect to FIGS. 2 through 7.

I claim:

1. A measuring apparatus for determining a circumferential length of a body, comprising:
   an elongate, non-extensible tape measure having a first and a second terminal;
   a measuring scale applied to said tape measure; first guide means for guiding said tape measure, and having first actuating means for either axially locking or allowing axial displacement of said tape measure relative to said first guide means, and, further, having a first index mark adjacent said tape measure;
   second guide means for guiding said tape measure, and having second actuating means for either axially locking or allowing axial displacement of said tape measure relative to said second guide means, and, further, having a second index mark adjacent said tape means;
   an elastic element having a first terminal fixedly attached to said first guide means and having a second terminal fixedly attached to said second guide means;
   said first terminal of said tape measure being fixedly attached to said first guide means in a direction opposite said elastic element, said tape measure extending from said first guide means through said second guide means for being guided therein adjacent said second index mark and, then, extending further through said first guide means for being guided therein adjacent said first index mark.

2. The apparatus of claim 1, in which said elastic element is an elastic rubber band.

3. The apparatus of claim 1, in which a cantilever nonextensible strip with a first terminal is attached to said first guide means, an opposite terminal of said strip carrying a third index mark, cooperating with said second index mark.

4. The apparatus of claim 1, in which said guide means are made as sliding parts having through-slots for axially guiding said tape measure.

* * * * *